(12) United States Patent
Yang et al.

(10) Patent No.: US 8,009,583 B2
(45) Date of Patent: Aug. 30, 2011

(54) ANTICIPATIVE RECURSIVELY-ADJUSTING CO-ALLOCATION MECHANISM

(75) Inventors: Chao-Tung Yang, Taichung (TW); Ming-Feng Yang, Taichung (TW)

(73) Assignee: Tunghai University, Taichung (TW)

( * ) Notice: Subject to any disclaimer, the term of this patent is extended or adjusted under 35 U.S.C. 154(b) by 106 days.

(21) Appl. No.: 12/556,413

(22) Filed: Sep. 9, 2009

(65) Prior Publication Data

US 2010/0208599 A1   Aug. 19, 2010

(30) Foreign Application Priority Data

Feb. 19, 2009   (TW) .............................. 98105346 A

(51) Int. Cl.
*H04L 12/26* (2006.01)
(52) U.S. Cl. ....................................... 370/252
(58) Field of Classification Search .................. 370/229, 370/230, 230.1, 231, 232, 235, 241, 252; 709/223–226, 230, 232, 233
See application file for complete search history.

(56) References Cited

U.S. PATENT DOCUMENTS

| | | | |
|---|---|---|---|
| 6,996,132 B1* | 2/2006 | Tolety | 370/517 |
| 7,171,488 B2* | 1/2007 | Cheng | 709/238 |
| 7,539,706 B1* | 5/2009 | Campbell | 1/1 |
| 2002/0194361 A1* | 12/2002 | Itoh et al. | 709/233 |

* cited by examiner

*Primary Examiner* — Chi H Pham
*Assistant Examiner* — Robert Lopata

(57) ABSTRACT

An anticipative recursively-adjusting co-allocation mechanism (ARAM) includes the steps of: measuring a transmission bandwidth of a candidate server by a bandwidth measurement module; referring to the transmission bandwidth to calculate a recursive parameter value, and calculating a desired allocating file size of present round according to the recursive parameter value and an unassigned file size; allocating the desired allocating file size to the candidate server according to the transmission bandwidth and a transmission completion percentage of the candidate server at a previous round; performing the transmission and calculating the transmission completion percentage of each candidate server; examining the transmission completion percentage of the candidate sever; and examining whether or not an allocation of files is completed if any candidate server has completed a transmission, and looping to the next round if the file allocation has not been completed so as to enhance the data transmission performance effectively.

10 Claims, 6 Drawing Sheets

ANTICIPATIVE RECURSIVELY-ADJUSTING CO-ALLOCATION MECHANISM

BACKGROUND OF THE INVENTION

1. Field of the Invention

The present invention relates to a data transmission method applied for data grids, in particular to an anticipative recursively-adjusting co-allocation mechanism plus (ARAM+) with a high-performance data transmission capability.

2. Brief Description of the Related Art

As Internet is developed rapidly, an exchange of a huge amount of files and data is taken place continuously in the Internet to satisfy a high demand of data transmissions for different users.

To satisfy the user requirement of a large number of data transmissions more quickly, we generally duplicate a dataset into a large number of copies to be transmitted and stored in a plurality of servers for providing a data grid of data transmission services. Therefore, it is a major subject in this field to provide a quick and effective way of transmitting data in the data grid environment.

With reference to FIG. 1 for a schematic view of a structure of a conventional co-allocation data transmission, a user sends a request to a broker 20 by an application program 10 for transmitting a data file, and the broker 20 inquires an information service 30 to obtain data of candidate servers 51, 52, 53 that store the user's required data file, and then a co-allocator 40 takes over the operation of starting a data transmission of the candidate servers 51, 52, 53 in a data grid storage system 50 by different co-allocation methods, so as to enhance the performance of data transmissions.

In a common conventional co-allocation method, a desired transmitting data file is divided into three equal parts, and the candidate servers 51, 52, 53 transmit the three equal parts parallelly. However, this method has not taken different transmission capabilities of the candidate servers 51, 52, 53 into consideration, the transmission time is obviously delayed by a server with a lower transmission speed, and thus other methods as illustrated in FIGS. 2, 3A and 3B are developed to improve the performance of the data transmission.

With reference to FIG. 2 for a flow chart of a conventional recursively-adjusting co-allocation method (RAM), a user defines a recursive parameter α and a reference minimum allocating file size first, and then in Step 201, an unassigned file size (UnassignedFileSize$_i$) for transmission is calculated, wherein the unassigned file size is set to be equal to a desired transmitting file size in initialization, and thereafter, the unassigned file size is a file size that has not been allocated for transmission. In Step 202, the unassigned file size is determined whether or not it is smaller than the minimum allocating file size defined by the user; if yes, then go to Step 203 to set the desired allocating file size to be equal to the unassigned file size, or else go to Step 204 to calculate the desired allocating file size $SE_i$=UnassignedFileSize$_i$*α of a desired transmission of present round.

In Step 205, a bandwidth of each candidate server measured by a network weather system (NWS) is used for allocating the transmitting file size of each candidate server in the present round. After the allocation is completed, the method enters into Step 206 to execute the transmission and calculate a transmission completion percentage of each candidate server. Step 207 determines whether or not there is any candidate server completing a transmission, and if no, then the method continues executing the transmission and calculating the completion percentage; if yes, then it means that at least one candidate server has completed the transmission in the present round. Step 208 determines whether or not the present round is the final round, which is the situation when the desired transmitting file has finished to be allocated; if no, then return to Step 201 to calculate the unassigned file size of the next round; if yes, then go to Step 209 to continue completing the data transmission of other candidate servers.

Although the recursively-adjusting co-allocation method as shown in FIG. 2 has taken different transmission capabilities of the candidate servers into consideration, yet the recursive parameter α and the minimum allocating file size are defined by users and remain unchanged, and thus the transmission performance is not dependent on a user's professionalism only, but it is also affected by the bandwidth of each candidate server non-instantaneously measured by the network weather system (NWS). Furthermore, the parameter, desired allocating file size and allocation method used for every round are obviously not flexible.

With reference to FIGS. 3A and 3B for a flow chart of a conventional anticipative recursively-adjusting co-allocation method (ARAM), a user still needs to define a recursive parameter α, and then in Step 301, an unassigned file size STi for transmission is calculated, wherein the unassigned file size STi is set to be equal to a desired transmitting file size in initialization, and thereafter the unassigned file size STi is set to be equal to the total sum of the file sizes that have not been allocated for transmission and the remainder that has not been transmitted by each candidate server in a previous round. In Step 302, the bandwidth of the candidate servers is measured in real time. In Step 303, the method determines whether or not the unassigned file size is larger than the sum of bandwidths of the candidate servers; if no, then go to Step 306 to set the desired allocating file size to be equal to the unassigned file size; if yes, then go to Step 304 to calculate the desired allocating file size SEi=STi*α in the present round.

In Step 305, the method determines whether or not the desired allocating file size is greater than the sum of bandwidths of the candidate servers; if no, then go to Step 306 to reset the desired allocating file size to the unassigned file size; if yes, then go to Step 307 to allocate the transmitting file size of each candidate server in the present round according to the measured bandwidth of each candidate server and the transmission completion percentage in a previous round.

After the desired allocating file size has been allocated, the procedure will enter into Step 308 to execute the transmission and calculate the transmission completion percentage of each candidate server. Step 309 determines whether or not there is any candidate server completing the transmission; if no, then the procedure continues executing the transmission and calculating the completion percentage; if yes, it means that at least one candidate server has completed the transmission in the present round. Step 310 determines whether or not the present round is the final round, which is the situation when the desired transmitting file has finished to be allocated; if no, then return to Step 301 to calculate the unassigned file size of the next round; if yes, then go to Step 311 to continue completing the data transmission of other candidate servers.

With reference to FIGS. 3A and 3B for the conventional anticipative recursively-adjusting co-allocation method, although the bandwidth of each candidate server is measured in real time, and included into the consideration of different transmission capabilities of the candidate servers, the reliability and accuracy of the bandwidth measurement method are low, so as to affect the actual transmission performance. Yet the recursive parameter α is defined by users and remains constant and cannot be adjusted in real time with a change of the transmission environment, so that the conventional method is not suitable for different data grid environments to achieve the expected transmission effect. Furthermore, the transmission mode and the calculation of the allocation method of the desired allocating file size still cannot meet the performance requirement.

SUMMARY OF THE INVENTION

It is a primary objective of the present invention to overcome the shortcomings of the prior art by providing an anticipative recursively-adjusting co-allocation mechanism capable of adjusting the recursive parameter in real time with a change of the transmission environment to improve the data transmission performance significantly.

Another objective of the present invention is to provide an anticipative recursively-adjusting co-allocation mechanism capable of allocating the desired allocating file size to each candidate server for transmitting parallelly with a change of the transmission environment, so as to further improve the data transmission performance.

A further objective of the present invention is to provide an anticipative recursively-adjusting co-allocation mechanism which applies a time division multi-session transmission technology to the data transmission of a data grid and further improves the data transmission performance.

To achieve the foregoing objectives and other objectives, the present invention provides an anticipative recursively-adjusting co-allocation mechanism applicable to recursively allocating a desired transmitting file to a plurality of candidate servers according to a recursive parameter.

The anticipative recursively-adjusting co-allocation mechanism comprises the steps of: measuring a transmission bandwidth of each candidate server in real time by a bandwidth measurement module such as a transmission control protocol bandwidth estimation model (TCPEM); referring to the transmission bandwidths of the candidate servers to calculate a recursive parameter value, and using the recursive parameter value and an unassigned file size of the desired transmitting file to calculate the desired allocating file size for the transmission in the present round; allocating the desired allocating file size to each candidate server according to the transmission bandwidth and the transmission completion percentage of each candidate server in a previous round, and obtaining a present round transmission file size of each candidate server transmitted in a present round; performing a transmission and calculating a transmission completion percentage of the present round transmission file size of each candidate server; examining the transmission completion percentage of each candidate server; and examining whether or not the file allocation has been completed if any candidate server has completed to transmit the present round transmission file size, and looping to a next round if the file allocation has not been completed.

The anticipative recursively-adjusting co-allocation mechanism calculates the recursive parameter value $\alpha_i$ by the following equation:

$$\alpha_i = 1 - \left[\frac{1}{\left(\sum_{j=1}^{n} B_{ji}\right)^{0.2}}\right] \text{ and } 0 < \alpha_i \le 1;$$

where, i stands for the number of recursive rounds; j stands for a different candidate server; and $B_{ji}$ stands for the transmission bandwidth of the candidate server.

The anticipative recursively-adjusting co-allocation mechanism further comprises the step of: classifying the candidate servers into a plurality of groups having different transmission capabilities according to the transmission bandwidth of each candidate server and the transmission completion percentage of the previous round.

The anticipative recursively-adjusting co-allocation mechanism uses the K-means algorithm to classify the candidate servers into two groups such as a fast group and a normal group, having different transmission capabilities.

The anticipative recursively-adjusting co-allocation mechanism allocate a desired allocating file size SEi that should be allocated for transmitting in the present round to each candidate server according to the following equations:

$$FastS_{ji} = \left[SE_i * \frac{B_{ji} * r_{ji-1}}{\sum_{j=1}^{n}(B_{ji} * r_{ji-1})}\right] * 2$$

and $$NormalS_{ji} = \left(SE_i - \sum_{j=1}^{n} FastS_{ji}\right) * \left[\frac{B_{ji} * r_{ji-1}}{\sum_{j=1}^{n}(B_{ji} * r_{ji-1})}\right];$$

where, i stands for the number of recursive rounds; j stands for a different candidate server; $FastS_{ji}$ stands for the present round transmission file size of the candidate server j in the fast group; $NormalS_{ji}$ stands for the present round transmission file size of the candidate server j of the normal group; $B_{ji}$ is the transmission bandwidth of the candidate server, and $r_{ji-1}$ is the transmission completion percentage of the candidate server j of the previous round.

In the anticipative recursively-adjusting co-allocation mechanism, the candidate servers classified as a fast group adopts a multi-session transmission method for transmitting data.

Wherein the unassigned file size STi of the anticipative recursively-adjusting co-allocation mechanism for every round is set to the desired transmitting file size in initialization, and thereafter the unassigned file size STi is calculated by the following equation:

$$ST_i = UnassignedFileSize_i + \sum_{j=1}^{n} UnfinishedFileSize_{ji-1}$$

where, i stands for the number of recursive rounds; j stands for a candidate server; $UnassignedFileSize_i$ stands for the file size that is not allocated for transmitting yet; and $UnfinishFileSize_{ji-1}$ stands for the file size that has not been transmitted by the candidate server j in the previous round.

In the anticipative recursively-adjusting co-allocation mechanism, the desired allocating file size SEi of every round is calculated by the following equation:

$$SE_i = ST_i * \alpha_i$$

where, $\alpha_i$ stands for the recursive parameter value calculated with reference to the measured transmission bandwidth of each candidate server; and STi stands for the unassigned file size of the present round.

In summation of the description above, the present invention has the following features:

1. The transmission bandwidth of the candidate servers measured by the TCPEM bandwidth measurement technology has excellent reliability and accuracy.

2. The recursive parameter value can be adjusted in real time with a change of the data grid environment and used to calculate the desired allocating file size, such that the file size allocated to each candidate server can fit each different data grid environment, instead of providing a design specifically for the experiment environment only.

3. The most efficient candidate server can be found quickly by the classification algorithm to improve the data transmission performance.

4. The time-division multi-session transmission technology is applied to the data transmission of the data grid to further improve the data transmission performance.

5. The data transmission capabilities of different candidate servers can be calculated separately, and the transmitted data volume is allocated according to the different capabilities to achieve the requirement for a high data transmission performance.

6. Besides supporting the data grid, the present invention can be applied for a job allocation of the calculation grid to improve the computation performance.

The above and other objects, features and advantages of the present invention will become apparent from the following detailed description of preferred embodiments taken with the accompanying drawings.

DETAILED DESCRIPTION OF THE INVENTION

Figure 1:
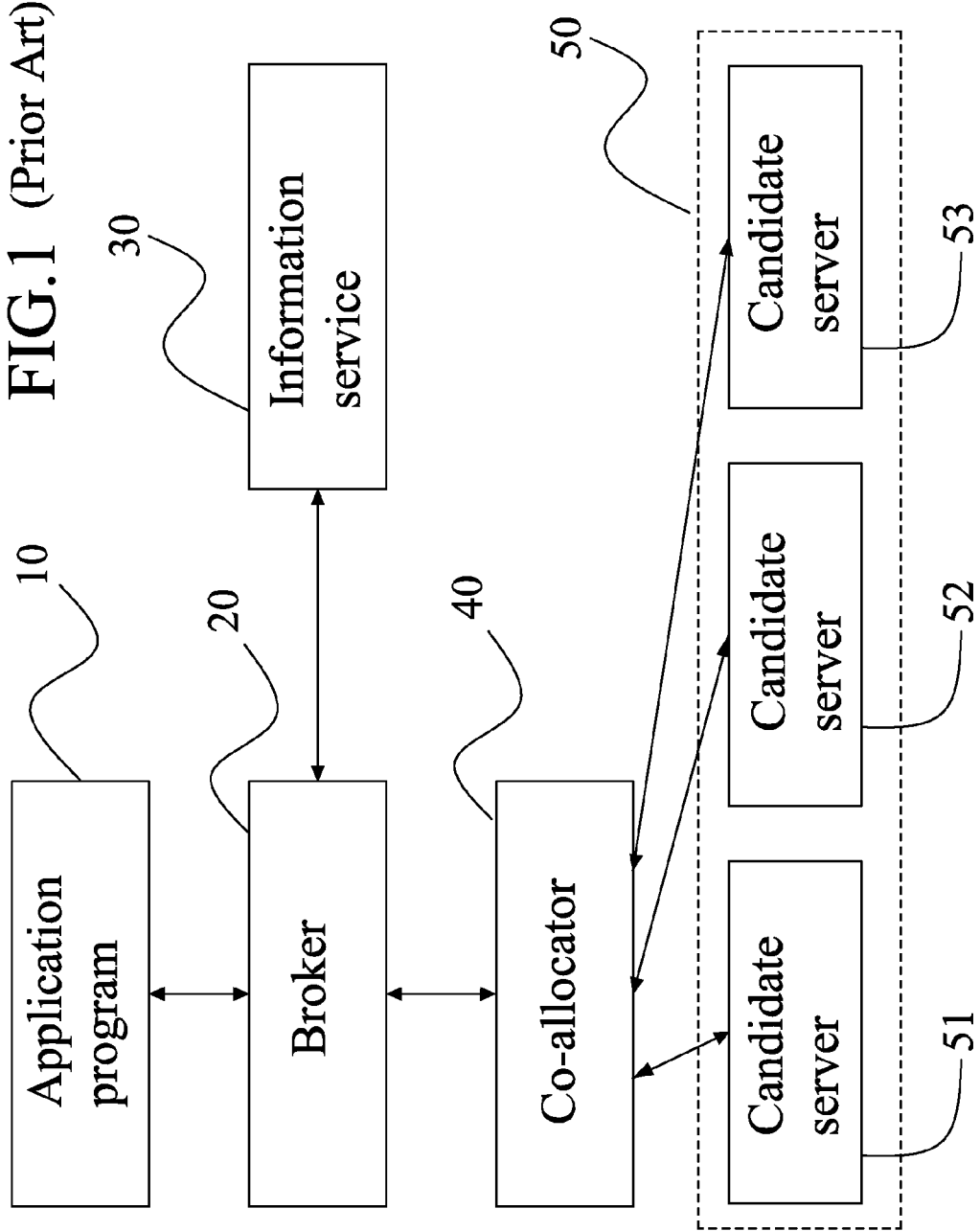
FIG. 1 is a schematic view of a structure of a conventional co-allocation data transmission.
Figure 2:
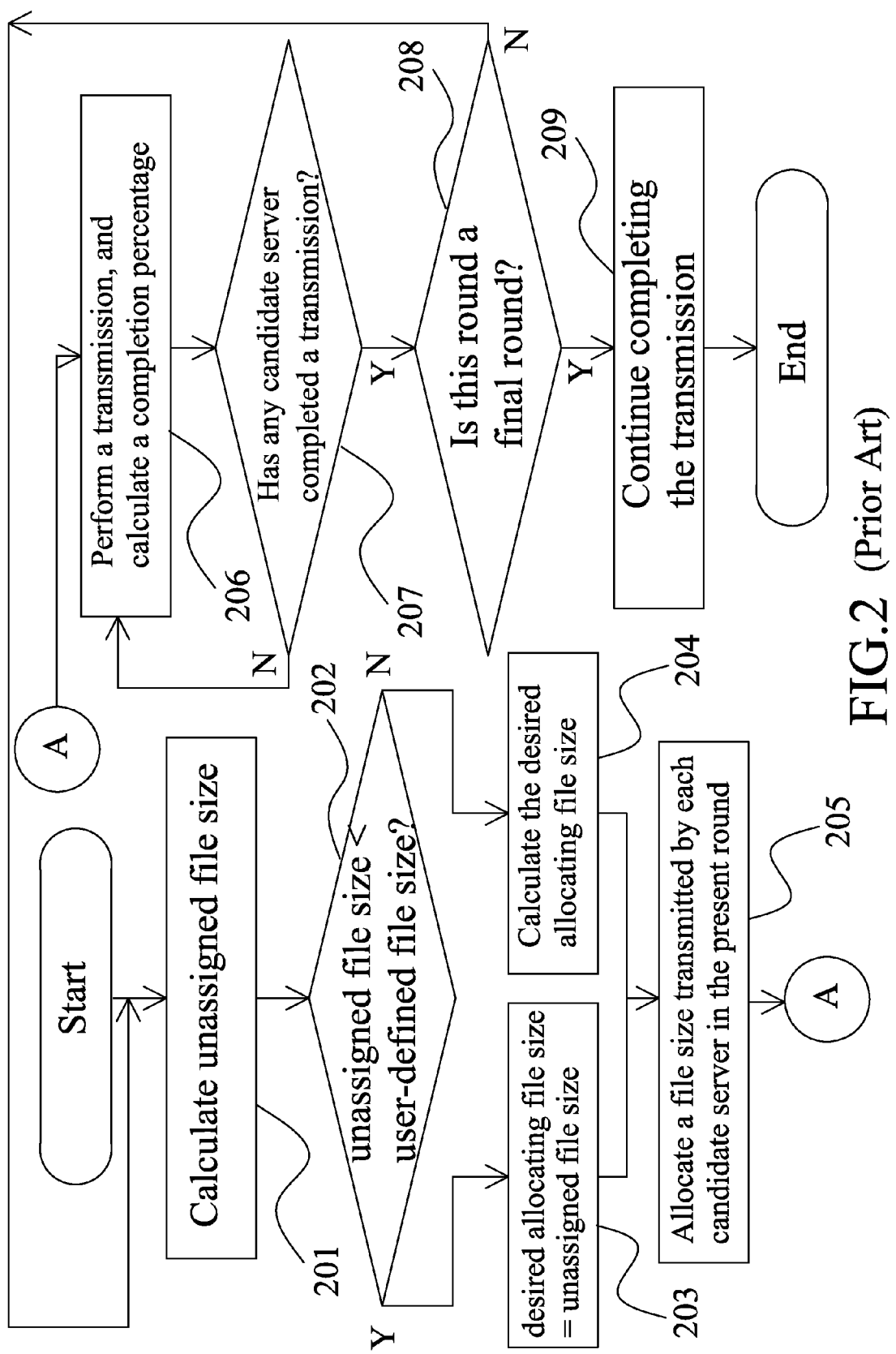
FIG. 2 is a flow chart of a conventional recursively-adjusting co-allocation method.
Figure 3A:
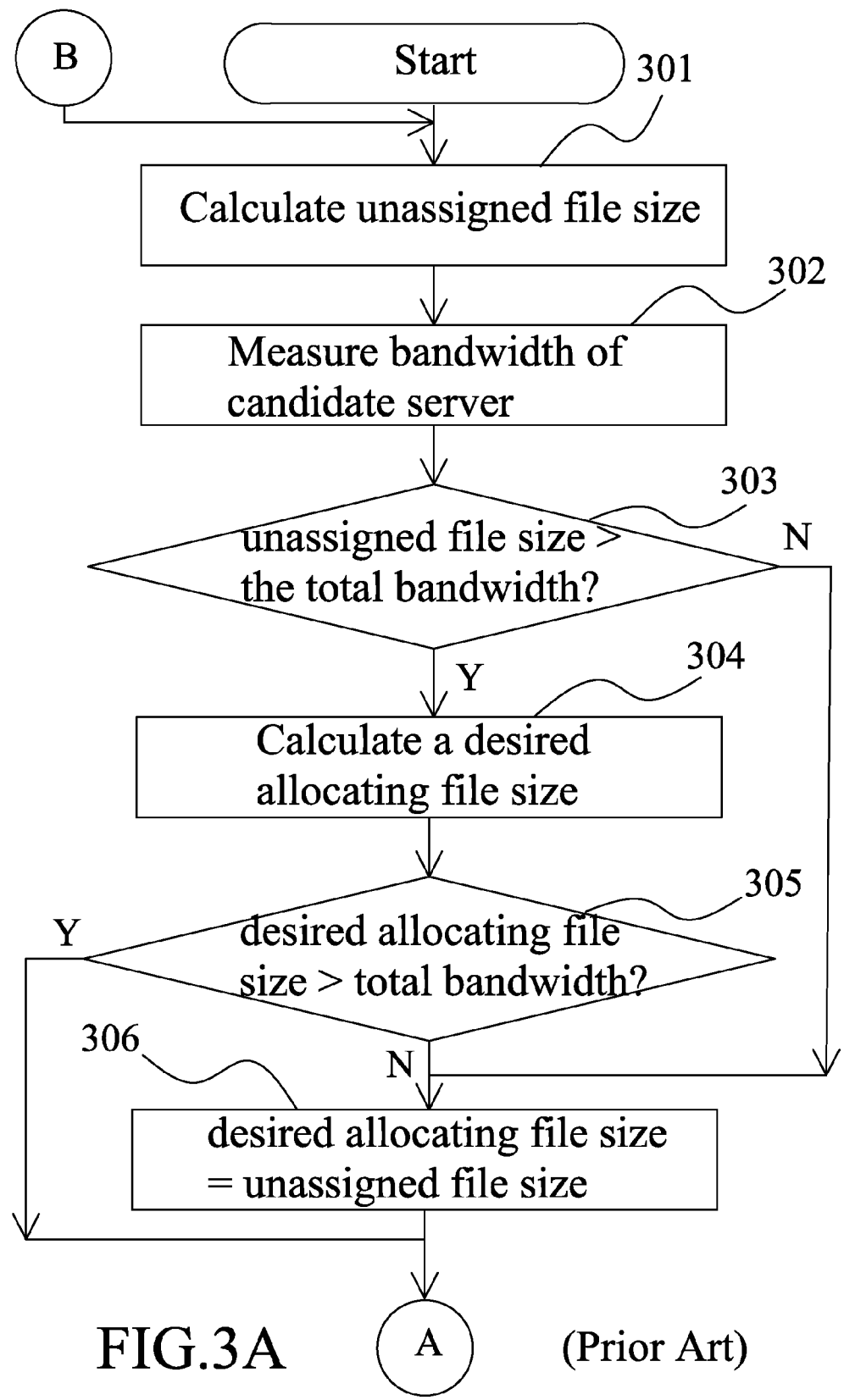
FIGS. 3A and 3B show a flow chart of a conventional anticipative recursively-adjusting co-allocation method.
Figure 3B:
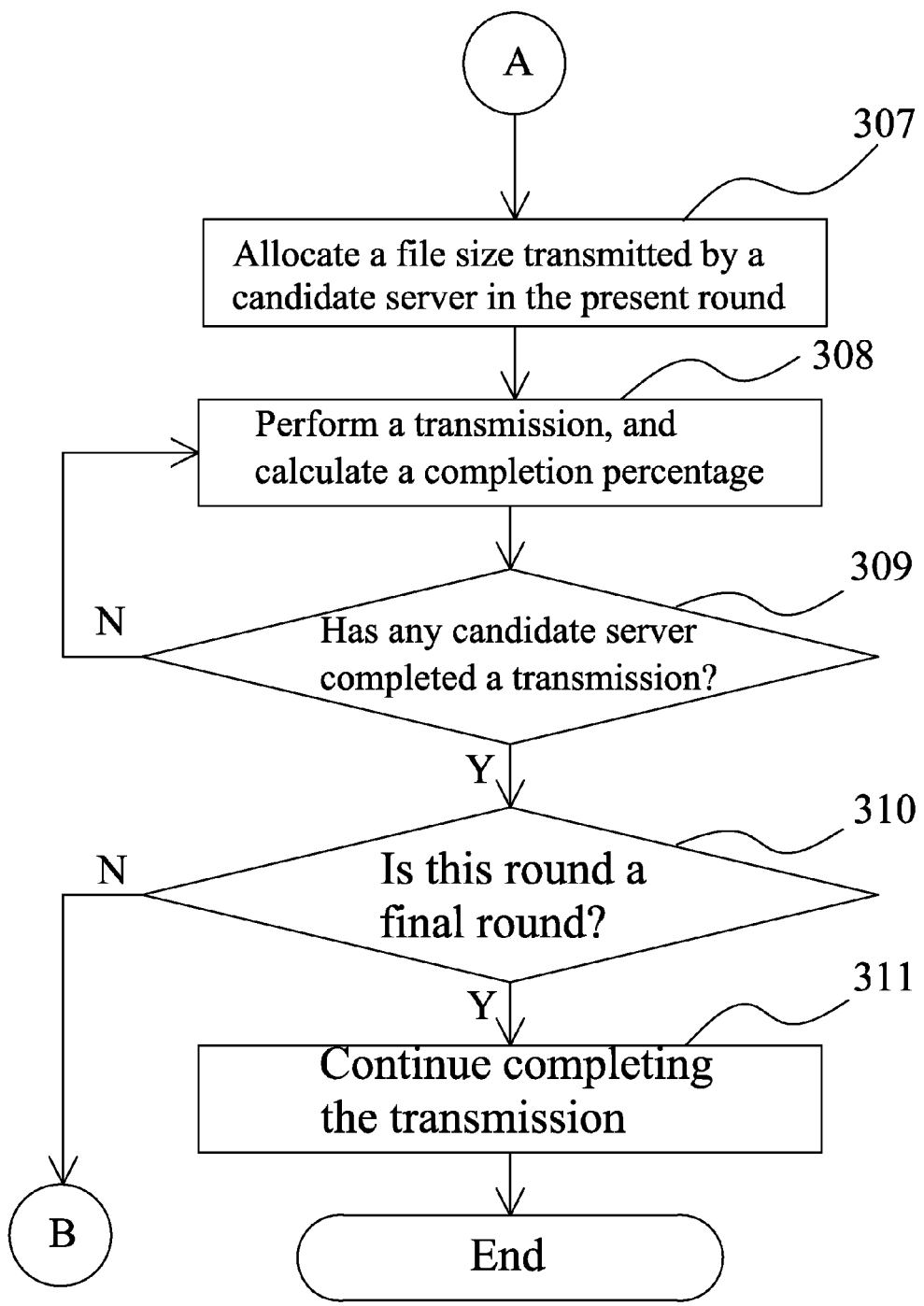
Figure 4A:
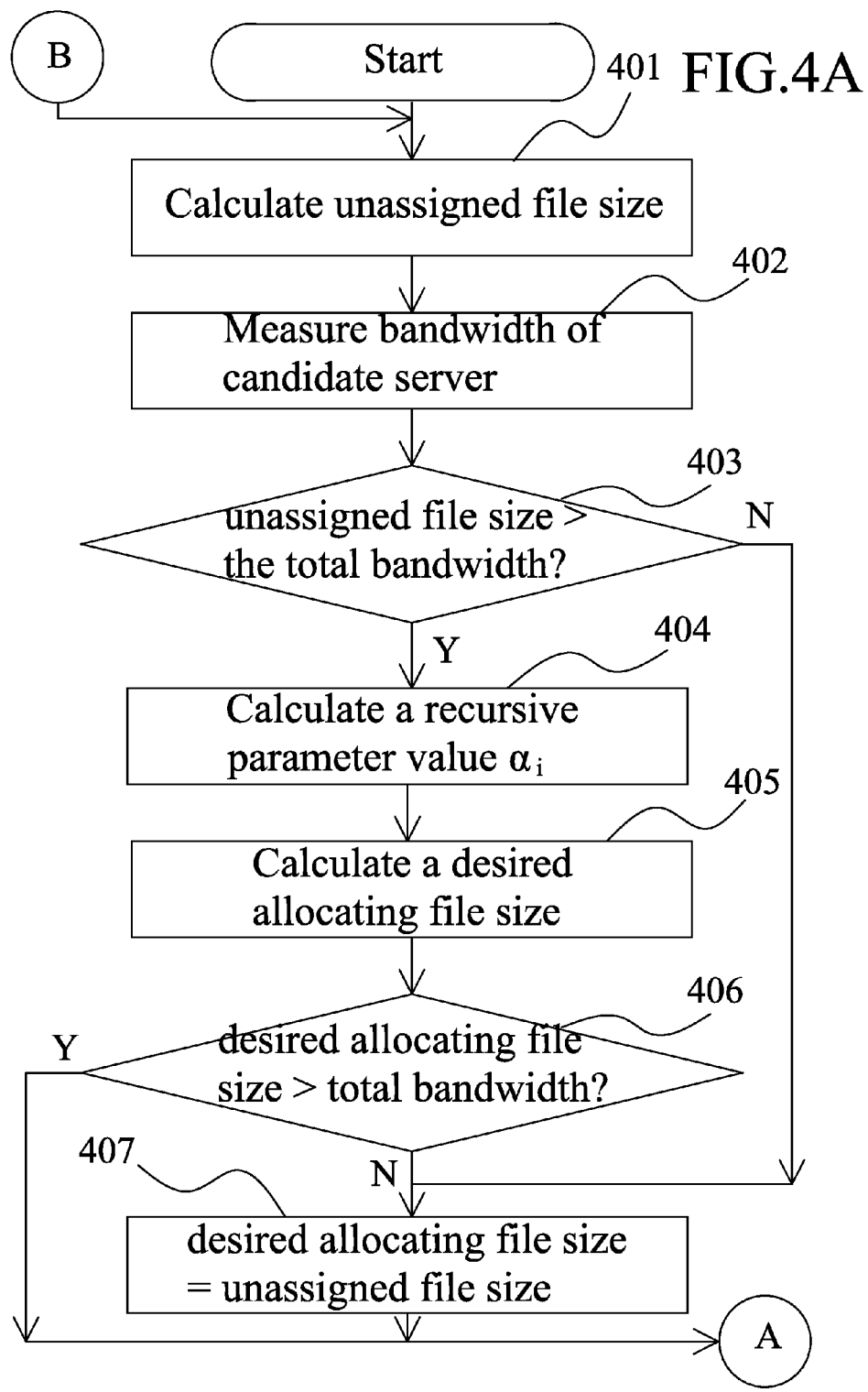
FIGS. 4A and 4B show a flow chart of an anticipative recursively-adjusting co-allocation mechanism of a preferred embodiment of the present invention.
Figure 4B:
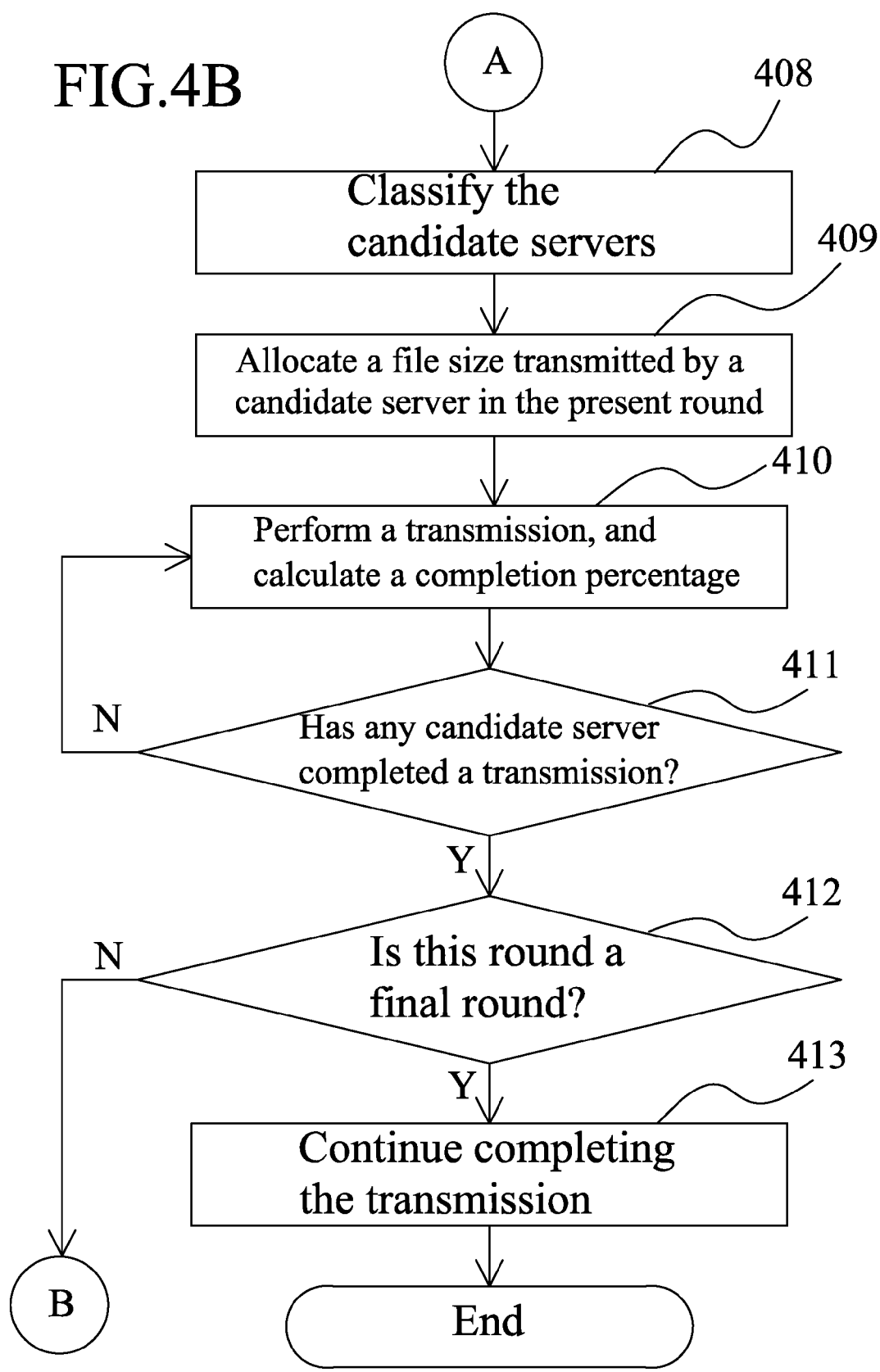

With reference to FIGS. 4A and 4B for a flow chart of an anticipative recursively-adjusting co-allocation mechanism in accordance with a preferred embodiment of the present invention, this mechanism is applicable for recursively allocating a desired transmitting file to a plurality of candidate servers for transmission according to a recursive parameter. In an anticipative recursively-adjusting co-allocation mechanism in accordance with a preferred embodiment of the present invention, the recursive parameter can be adjusted in real time with a change of the data grid environment to improve the data transmission performance effectively.

In Step 401, the unassigned file size $ST_i$ for transmission in the present round is calculated, wherein the unassigned file size $ST_i$ is set to be equal to the desired transmitting file size in initialization, and thereafter is set to be equal to the total sum of the file sizes that have not been allocated for transmitting (which is the remaining file size) and the file size that has not been transmitted completely by each candidate server in a previous round, and the calculation is performed according to the equation as follows:

$$ST_i = UnassignedFileSize_i + \sum_{j=1}^{n} UnfinishedFileSize_{j_{i-1}} \quad (1)$$

where, i stands for a number of recursive rounds; j stands for the candidate server, $UnassignedFileSize_i$ stands for the file size that has not be allocated for transmitting; and $UnfinishFileSize_{j_{i-1}}$ stands for the file size that has not been transmitted completely by the candidate server j in a previous round.

In Step 402, a bandwidth measurement module such as a transmission control protocol bandwidth estimation model (TCPEM) is provided for measuring the transmission bandwidth of each candidate server in real time. Step 403 determines whether or not the unassigned file size is greater than the total sum of the transmission bandwidths of the candidate servers; if no, then the procedure will go to Step 407 to set the desired allocating file size to be equal to the unassigned file size: if yes, the procedure will go to Step 404 to calculate the recursive parameter value $\alpha_i$ by the following equation:

$$\alpha_i = 1 - \left[\frac{1}{\left(\sum_{j=1}^{n} B_{ji}\right)^{0.2}}\right] \text{ and } 0 < \alpha_i \le 1 \quad (2)$$

where, i stands for a number of recursive rounds; j stands for one of the candidate servers; and $B_{ji}$ stands for the transmission bandwidth of the candidate server j.

After Step 404 has completed the calculation of the recursive parameter value $\alpha_i$, the procedure enters into Step 405 to calculate the desired allocating file size SEi of the present round. The desired allocating file size SEi of the present round is calculated by the equation of:

$$SE_i = ST_i * \alpha_i \quad (3)$$

where, $\alpha_i$ stands for the recursive parameter value calculated with reference to the measured transmission bandwidth of each candidate server, and STi stands for the unassigned file size of the present round.

Step 406 determines whether or not the desired allocating file size SEi calculated in Step 405 is greater than the total sum of the transmission bandwidths of the candidate servers; if no, then the procedure will enter into Step 407 to reset the desired allocating file size SEi to the unassigned file size STi; if yes, then the procedure will enter into Steps 408 and 409 to allocate the desired allocating file size to each candidate server to obtain the present round transmission file size transmitted by each candidate server in the present round according to the measured transmission bandwidth and the transmission completion percentage of each candidate server in the previous round.

In the aforementioned Steps 403 and 406, the Step 403 determines whether or not the unassigned file size STi is greater than the total sum of the transmission bandwidths of the candidate servers, and the Step 406 determines whether or not the desired allocating file size SEi is greater than the total sum of the transmission bandwidths of the candidate servers in order to confirm whether or not the unassigned file size STi that has not been allocated in the present round is not large enough, such that the unassigned file size STi can be allocated completely in the present round, and the program can enter into the final round.

In Step 408, the candidate servers are classified by a K-means algorithm into two groups such as a fast group and a normal group according to different transmission capabilities of the candidate servers. The K-means algorithm is an algorithm used for classifying the candidate servers into a plurality of groups having different transmission capabilities according to the transmission bandwidth of each candidate serve and the transmission completion percentage of the previous round, and this algorithm is a prior art and thus will not be described here again.

In Step 409, the classification of the candidate servers in Step 408 is referenced to allocate the desired allocating file size SEi that should be allocated in the present round to each candidate server, and the equations for the allocation are given below:

$$FastS_{ji} = \left[SE_i * \frac{B_{ji} * r_{ji-1}}{\sum_{j=1}^{n}(B_{ji} * r_{ji-1})}\right] * 2 \quad (4)$$

$$NormalS_{ji} = \left(SE_i - \sum_{j=1}^{n} FastS_{ji}\right) * \left[\frac{B_{ji} * r_{ji-1}}{\sum_{j=1}^{n}(B_{ji} * r_{ji-1})}\right] \quad (5)$$

where, i stands for the number of recursive rounds; j stands for the candidate server; $FastS_{ji}$ stands for the present round transmission file size transmitted by the candidate server j of a fast group in the present round; $NormalS_{ji}$ stands for the present round transmission file size transmitted by the candidate server j of a normal group in the present round; $B_{ji}$ stands for the measured transmission bandwidth of the candidate server j; and $r_{ji-1}$ stands for the transmission completion percentage of the candidate server j in the previous round.

After the allocation has been completed in Steps 408 and 409, the procedure will enter into Step 410 to execute the transmission and calculate the transmission completion percentage of each candidate server. Step 411 determines whether or not any of the candidate servers has completed the transmission. Since the candidate server classified as a fast group carries a heavy burden for the allocation of the file size transmitted in the present round, the candidate servers classified as a fast group transmit data by a so-called multi-session transmission method, so as to improve the transmission performance effectively.

In Step 411, if no candidate server has completed the transmission, then the procedure will enter into Step 410 to continue executing the transmission and calculating the transmission completion percentage, or else there is at least one candidate server completing the transmission of this round, and the procedure will enter into Step 412 to determine whether or not the present round is the final round, which is the condition when the size of the desired transmitting file not allocated for transmitting is equal to zero. If the present round is not the final round determined in Step 412, then the procedure will go to Step 401 to perform a transmission of a next round, or else the procedure will go to Step 413 to continue the data transmission of the candidate server that has not completed the transmission yet.

In summation of the description above, the anticipative recursively-adjusting co-allocation mechanism in accordance with a preferred embodiment of the present invention not just adjusts the recursive parameter in real time with a change of the transmission environment only, so as to improve the data transmission performance substantially, but also allocates the desired allocating file size to each candidate server for transmitting parallelly with a change of the transmission environment, and applies the time-division multi-session transmission technology to the data transmission of a data grid to further improve the data transmission performance.

While the invention has been described by means of specific embodiments, various modifications and variations could be made thereto by those skilled in the art without departing from the scope and spirit of the invention set forth in the claims.

What is claimed is:

1. An anticipative recursively-adjusting co-allocation method, which is applicable for recursively allocating a desired transmitting file to a plurality of candidate servers for transmission according to a recursive parameter, comprising the steps of:
    measuring a transmission bandwidth of said each candidate server by a bandwidth measurement module;
    referring to the transmission bandwidth of said each candidate server to calculate the recursive parameter value, and using the recursive parameter value and an unassigned file size to calculate a desired allocating file size allocated for a transmission in a present round;
    allocating the desired allocating file size to said each candidate server to obtain a present round transmission file size according to the transmission bandwidth and a transmission completion percentage of said each candidate server in a previous round;
    performing a transmission and calculating the transmission completion percentage of the present round transmission file size of said each candidate server;
    examining the transmission completion percentage of said each candidate server; and
    examining whether or not the file allocation is completed if any of said candidate servers has completed to transmit the present round transmission file size, and looping to a next round if the file allocation has not been completed yet.

2. The anticipative recursively-adjusting co-allocation method of claim 1, wherein the recursive parameter value $\alpha_i$ is calculated by the equation of:

$$\alpha_i = 1 - \left[\frac{1}{\left(\sum_{j=1}^{n} B_{ji}\right)^{0.2}}\right]$$

$0 < \alpha_i \leq 1$, wherein, i stands for a number of recursive rounds; j stands for said candidate server, and $B_{ji}$ stands for the transmission bandwidth.

3. The anticipative recursively-adjusting co-allocation method of claim 1, wherein the bandwidth measurement module is a transmission control protocol bandwidth estimation model (TCPEM).

4. The anticipative recursively-adjusting co-allocation method of claim 1, further comprising the step of: classifying said candidate servers into a plurality of groups having different transmission capabilities according to the transmission bandwidth of said candidate servers and the transmission completion percentage of a previous round.

5. The anticipative recursively-adjusting co-allocation method of claim 4, wherein said candidate servers are classified into a plurality of groups having different transmission capabilities by a K-means algorithm.

6. The anticipative recursively-adjusting co-allocation method of claim 5, wherein said candidate servers are classified into a fast group and a normal group.

7. The anticipative recursively-adjusting co-allocation method of claim 6, wherein the desired allocating file size SEi is allocated to said each candidate servers according to the equation of:

$$FastS_{ji} = \left\lceil SE_i * \frac{B_{ji} * r_{ji-1}}{\sum_{j=1}^{n}(B_{ji} * r_{ji-1})} \right\rceil * 2$$

$$NormalS_{ji} = \left(SE_i - \sum_{j=1}^{n} FastS_{ji}\right) * \left\lceil \frac{B_{ji} * r_{ji-1}}{\sum_{j=1}^{n}(B_{ji} * r_{ji-1})} \right\rceil$$

wherein, i stands for a number of recursive rounds; j stands for said candidate server; $FastS_{ji}$ stands for the present round transmission file size of said candidate server of the fast group; $NormalS_{ji}$ stands for the present round transmission file size of said candidate server of the normal group; $B_{ji}$ stands for the transmission bandwidth; and $r_{ji-1}$ stands for the transmission completion percentage in a previous round.

8. The anticipative recursively-adjusting co-allocation method of claim 7, wherein said candidate servers of the fast group transmit data by a multi-session transmission method.

9. The anticipative recursively-adjusting co-allocation method of claim 1, wherein the unassigned file size STi is set to be equal to the desired transmitting file size in initialization, and thereafter the unassigned file size STi is calculated by the equation of:

$$ST_i = UnassignedFileSize_i + \sum_{j=1}^{n} UnfinishedFileSize_{ji-1}$$

where, i stands for a number of recursive rounds; j stands for said candidate server; $UnassignedFileSize_i$ stands for the file size that is not allocated for transmitting yet; and $UnfinishFileSize_{ji-1}$ stands for a file size that has not been transmitted by said candidate server in a previous round.

10. The anticipative recursively-adjusting co-allocation method of claim 9, wherein the desired allocating file size SEi is calculated by the equation of:

$$SE_i = ST_i * \alpha_i$$

wherein, $\alpha_i$ stands for the recursive parameter value, and $ST_i$ stands for the unassigned file size.

\* \* \* \* \*